(12) United States Patent
Fan

(10) Patent No.: US 12,062,999 B2
(45) Date of Patent: Aug. 13, 2024

(54) METHOD FOR CONTROLLING A ROTATIONAL SPEED OF AN ELECTRIC TOOL AND ELECTRIC TOOL

(71) Applicant: Nanjing Chervon Industry Co., Ltd., Nanjing (CN)

(72) Inventor: Baofeng Fan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 62 days.

(21) Appl. No.: 17/202,473

(22) Filed: Mar. 16, 2021

(65) Prior Publication Data
US 2021/0313909 A1   Oct. 7, 2021

(30) Foreign Application Priority Data
Apr. 7, 2020  (CN) .......................... 202010264740.1

(51) Int. Cl.
*H02P 1/16*  (2006.01)
*B25F 5/00*  (2006.01)
*H02K 11/33* (2016.01)
*H02P 29/032* (2016.01)

(52) U.S. Cl.
CPC ................. *H02P 1/16* (2013.01); *B25F 5/00* (2013.01); *H02K 11/33* (2016.01); *H02P 29/032* (2016.02)

(58) Field of Classification Search
CPC .... B25F 5/00; B25F 5/001; H02P 1/16; H02P 29/032; H02K 11/33

USPC .......................................................... 173/1
See application file for complete search history.

(56) References Cited

U.S. PATENT DOCUMENTS

| | | | |
|---|---|---|---|
| 2003/0117095 A1* | 6/2003 | Gorti | H02P 6/20 318/434 |
| 2015/0041164 A1* | 2/2015 | Sergyeyenko | B25B 23/147 173/176 |
| 2017/0331411 A1* | 11/2017 | Kitano | H02P 29/0241 |
| 2023/0046384 A1* | 2/2023 | Hisatomi | H02P 29/025 |

FOREIGN PATENT DOCUMENTS

| CN | 102204451 A | 10/2011 |
|---|---|---|
| CN | 108242908 A | 3/2020 |

* cited by examiner

*Primary Examiner* — Anne Marie Antonucci
*Assistant Examiner* — Luis G Del Valle
(74) *Attorney, Agent, or Firm* — Greenberg Traurig, LLP

(57) ABSTRACT

A method for controlling a rotational speed of an electric tool includes starting a motor and controlling the motor to operate at a constant speed which is a preset rotational speed in response to determining that a motor of the electric tool is in a preset low-speed mode, increasing output torque until the motor runs in response to a rotor of the motor being locked, and controlling, based on a relationship between a current rotational speed of the motor and the preset rotational speed, the motor to operate at a constant speed. In this manner, the problem where a rotor is easily locked when the electric tool runs in a low-speed mode in the related art is solved and the electric tool can adaptively adjust an output rotational speed of the motor according to the load condition.

4 Claims, 4 Drawing Sheets

METHOD FOR CONTROLLING A ROTATIONAL SPEED OF AN ELECTRIC TOOL AND ELECTRIC TOOL

RELATED APPLICATION INFORMATION

This application claims the benefit of CN 202010264740.1, filed on Apr. 7, 2020, the disclosure of which is incorporated herein by reference in its entirety.

BACKGROUND

An electric tool such as an electric drill, a screwdriver or a reciprocating saw typically operates at a preset speed when the electric tool is just started. When the electric tool is just started, a user needs to align the electric tool to a position. For example, a screw is accurately screwed by the electric tool, a hole is drilled by the electric tool, or a cutting is performed along a line by the electric tool. Therefore, too high of a preset speed cannot satisfy the user's requirement for a low speed, while too low of a preset speed results in a locked rotor of the electric tool or even a failure to start the electric tool when a load gets slightly bigger.

SUMMARY

The present disclosure describes an electric tool and a method for controlling a rotational speed of an electric tool so as to achieve adaptive adjustment of a speed at which the electric tool is started.

In a first aspect, examples of the present disclosure provide a method for controlling a rotational speed of an electric tool. The method includes steps described below.

In response to determining that a motor of the electric tool is in a preset low-speed mode, the motor is started and controlled to operate at a constant speed which is a preset rotational speed.

In response to a rotor of the motor being locked, output torque is increased until the motor runs.

The motor is controlled, based on a relationship between a current rotational speed of the motor and the preset rotational speed, to operate at a constant speed.

Optionally, the step of determining that the motor of the electric tool is in the preset low-speed mode includes steps described below.

A travel signal of a switch of the electric tool is acquired.

In response to the travel signal of the switch being less than or equal to a set value, it is determined that the motor of the electric tool is in the preset low-speed mode.

Optionally, it is determined that the rotor of the motor is locked by a method described below.

A phase-change signal of the motor is acquired.

In response to a next phase-change signal being not received within a set time threshold, it is determined that the rotor of the motor is locked.

Optionally, the step of increasing the output torque includes a step described below.

A drive signal with a preset duty cycle increment is outputted to the motor so that the output torque of the motor is increased.

Optionally, after the output torque is increased and before the motor runs, the method further includes a step described below.

In response to a duty cycle of the drive signal reaching a set duty cycle threshold, the drive signal is stopped being outputted to the motor.

Optionally, the step of controlling, based on the relationship between the current rotational speed of the motor and the preset rotational speed, the motor to operate at the constant speed includes steps described below.

A current rotational speed of the motor is compared with the preset rotational speed.

In response to the current rotational speed being greater than or equal to the preset rotational speed, the motor is controlled to operate at the constant speed which is the preset rotational speed.

In response to the current rotational speed being less than the preset rotational speed, the motor is controlled to operate at the constant speed which is the current rotational speed.

In a second aspect, examples of the present disclosure further provide an electric tool. The electric tool includes a function part, a motor, a travel switch and a controller.

The function part is configured to implement a function of the electric tool.

The motor is configured to drive the function part to rotate.

The travel switch is configured to output a switch travel signal, where the switch travel signal is used for determining an operating mode of the motor.

The controller is configured to: in response to determining that the motor is in a preset low-speed mode, start the motor and control the motor to operate at a constant speed which is a preset rotational speed.

Optionally, the operating mode of the motor includes at least the preset low-speed mode and a normal mode.

Optionally, the controller is further configured to perform operations described below.

In response to determining that the switch travel signal is less than or equal to a set value, it is determined that the motor is in the preset low-speed mode.

In response to determining that the switch travel signal is greater than the set value, it is determined that the motor is in the normal mode.

Optionally, the controller is further configured to perform operations described below.

A current rotational speed of the motor is compared with the preset rotational speed.

In response to the current rotational speed being greater than or equal to the preset rotational speed, the motor is controlled to operate at the constant speed which is the preset rotational speed.

In response to the current rotational speed being less than the preset rotational speed, the motor is controlled to operate at a constant speed which is the current rotational speed.

In response to determining that a rotor of the motor is locked, the motor is controlled to run and operate at a constant speed by adjusting a duty cycle.

In the method for controlling a rotational speed of an electric tool provided by the examples of the present disclosure, when the controller detects that the electric tool is in the set low-speed mode, the motor of the electric tool is started and the motor is controlled to operate at the constant speed which is the preset rotational speed so that the electric tool can operate at the constant speed which is the preset rotational speed when the electric tool is just started, thereby satisfying the requirements of a user. When the rotor of the motor is locked, the controller increases the output torque to enable the motor to run again. After the motor is started and runs again, the controller determines how to control the rotational speed of the motor and causes the motor to operate at a constant speed according to the relationship between the current rotational speed of the motor and the preset rotational speed so that the electric tool can adjust the rotational speed of the motor according to a current load condition. In this manner, the problem of a locked rotor in response to a slightly larger load when an electric tool runs in a low-speed mode in the related art is solved; and when the electric tool is in the low-speed mode, the electric tool can adaptively adjust an output rotational speed of the motor according to the load condition, switch between the locked rotor and a constant-speed running mode, and finally enable the motor to operate at a constant speed, thereby improving user experience when the electric tool is in the low-speed mode.

DETAILED DESCRIPTION

Hereinafter the present disclosure will be further described in detail in conjunction with drawings and examples. It is to be understood that the examples described herein are merely intended to illustrate and not to limit the present disclosure.

Figure 1:
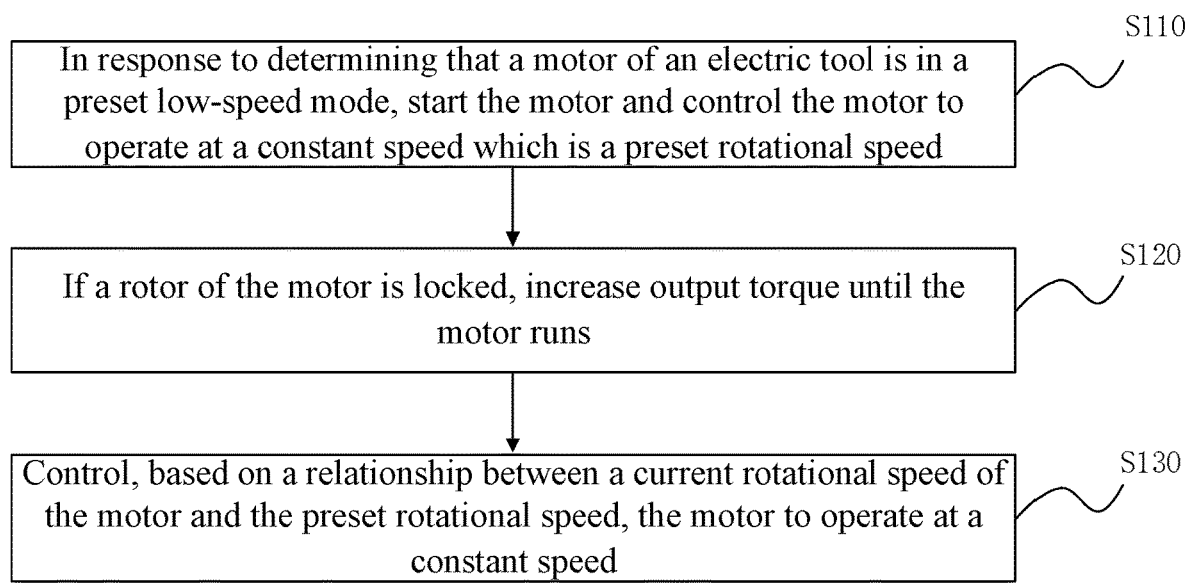
FIG. 1 is a flowchart of a method for controlling a rotational speed of an electric tool according to an example of the present disclosure.

FIG. 1 is a flowchart of a method for controlling a rotational speed of an electric tool according to an example of the present disclosure. This example may be applied to a case where a rotational speed is controlled when the electric tool is in a low-speed mode. For example, when the electric tool is started, the electric tool typically needs to run at a lower rotational speed so as to satisfy a user's requirement for accurate control such as alignment of the electric tool in the low-speed mode. At the same time, the problem of a locked rotor of the electric tool needs to be resolved such that the electric tool can automatically adjust output torque of a motor according to a load condition and run according to requirements set for the low-speed mode. As shown in FIG. 1, the method specifically includes steps described below.

In S110, in response to determining that the motor of the electric tool is in a preset low-speed mode, the motor is started and controlled to operate at a constant speed which is a preset rotational speed.

The electric tool refers to a tool that converts electrical energy into mechanical energy to drive a corresponding function part to operate, such as a commonly used electric drill, a grinding miller, a screwdriver or a reciprocating saw. The low-speed mode refers to that the electric tool is required to run at a set lower speed so as to facilitate the control of the electric tool by the user, and the low-speed mode is typically used for the control of the electric tool in a startup stage. Generally, the electric tool is provided with at least two operating modes for the user to select. For example, the at least two operating modes include the low-speed mode and a normal mode, and the user may select the operating mode of the electric tool via a switch element of the electric tool.

In one example, it is determined that the motor of the electric tool is in the preset low-speed mode by a method described below.

A travel signal of a switch of the electric tool is acquired.

If the travel signal of the switch is less than or equal to a set value, it is determined that the motor of the electric tool is in the preset low-speed mode.

Specifically, the switch of the electric tool may be used for selecting the operating mode of the electric tool. Optionally, the switch may be a travel switch, and the travel signal of the travel switch has a correspondence with a set rotational speed of the motor in the electric tool. Generally, the travel signal of the travel switch of the electric tool is directly proportional to the rotational speed of the motor of the electric tool, that is, the greater travel the switch has, the greater the rotational speed of the motor. Therefore, a running mode of the motor may be determined according to the travel signal of the switch.

When the travel signal of the switch is less than or equal to the set value, it indicates that the user expects that the electric tool runs in the low-speed mode, that is, the motor outputs a lower rotational speed. Optionally, the set value may be set to 30% of a total travel of the switch. That is to say, when the travel signal of the switch is less than or equal to 30% of the total travel of the switch, it is determined that the motor is in the preset low-speed mode.

Starting the motor refers to causing the motor to start to rotate from a stationary state. Operating at the constant speed refers to causing the motor to rotate at a constant speed according to a certain speed.

In one example, the step in which the motor is started and controlled to operate at the constant speed may specifically include steps described below.

A controller applies a drive signal with a first preset duty cycle to the motor through a drive circuit so as to drive the motor to start to run and operate at the constant speed which is the preset rotational speed.

The controller collects an actual rotational speed of the motor, compares the actual rotational speed of the motor with the preset rotational speed, and when the actual rotational speed of the motor exceeds the preset rotational speed, decreases a duty cycle of the drive signal applied to the motor, so as to control the motor to operate at a constant speed which does not exceed a target rotational speed.

In S120, if a rotor of the motor is locked, output torque is increased until the motor runs.

The locked rotor of the motor refers to a case where the motor still outputs the output torque when the rotational speed is zero. In this case, the rotor in the motor cannot rotate normally, but a stator in the motor is still powered continuously. Therefore, the motor is easy to be damaged when its rotor is locked. If the rotor of the motor is locked when the electric tool is started, the electric tool cannot be normally started.

In one example, it may be determined that the rotor of the motor is locked by a method described below.

A phase-change signal of the motor is acquired.

If a next phase-change signal is not received within a set time threshold, it is determined that the rotor of the motor is locked.

Specifically, the controller applies a corresponding control signal to the stator of the motor according to a current position of the rotor of the motor such that the rotor rotates from the current position to a next position. The switching of the stator of the motor from one powered state to another powered state is referred to as a phase change. During each phase change, the controller of the electric tool may record a time of the phase change. In this manner, the controller determines whether the phase changes are normal by calculating a time difference between two consecutive phase changes and comparing the time difference with the time threshold. For example, if the set time threshold is 50 ms and the time difference between two consecutive phase changes is 45 ms, that is, the next phase-change signal can be received within the set time threshold, it is determined that the rotor in the electric tool is not locked. If the time difference between two consecutive phase changes is 51 ms, that is, the next phase-change signal is not received within the set time threshold, it is determined that the rotor in the electric tool is locked.

The set time threshold is related to the rotational speed of the motor, and the greater the rotational speed, the smaller the time threshold. Generally, the time threshold is set to a multiple of a theoretical time difference between phase changes under a corresponding rotational speed. For example, if a normal phase-change time under a certain rotational speed is 2 ms, the time threshold may be set to 30 ms so as to accurately determine that the rotor of the motor is locked.

After the controller determines that the rotor of the motor is locked, the output torque of the motor is increased. Increasing the output torque refers to causing the motor to output a greater driving force. For example, a drive signal with greater intensity may be applied to the motor so that the motor can be started and run in a case where a load increases.

In one example, a drive signal with a preset duty cycle increment is outputted to the motor so that the output torque of the motor is increased.

The preset duty cycle increment refers to that the duty cycle of the drive signal outputted by the drive circuit is increased according to a preset increment. In this manner, the duty cycle of the drive signal outputted by the drive circuit to the motor is increased so that the intensity of the drive signal applied to the motor can be gradually increased and the output torque of the motor can be gradually increased until the motor starts to rotate again.

In one example, in order to protect the motor in the case of the locked rotor, before the motor rotates, the method further includes a step described below.

If the duty cycle of the drive signal reaches a set duty cycle threshold, the drive signal is stopped being outputted to the motor.

As can be seen from the above analysis, when the rotor of the motor is locked, the stator of the motor is still powered continuously, and this part of electrical energy is converted into heat energy and consumed in windings of the stator of the motor instead of being converted into mechanical energy. The motor is easy to be damaged when too much heat energy is generated. Therefore, in order to protect the motor in the case of the locked rotor, when the rotor of the motor is locked, the intensity of the drive signal applied to the motor needs to be limited. Specifically, the duty cycle of the drive signal applied to the motor is limited such that the intensity of the drive signal is limited within a safe range.

In one example, in the low-speed mode, an upper limit of the duty cycle of the drive signal applied to the motor is 40%. If the motor is still not started (its rotor is still locked) when the duty cycle of the drive signal is adjusted to 40%, the drive signal is stopped being applied to the motor and the motor is protected in the case of the locked rotor.

In this example, before the motor rotates, the motor can be protected from being damaged by controlling the duty cycle of the drive signal applied to the motor.

In S130, the motor is controlled, based on a relationship between a current rotational speed of the motor and the preset rotational speed, to operate at a constant speed.

The relationship between the current rotational speed of the motor and the preset rotational speed specifically refers to a relationship in size between the current rotational speed of the motor and the preset rotational speed. The motor can output different rotational speeds under different loads. In the case of the same drive signal, the motor outputs a lower rotational speed under a greater load; and conversely, the motor outputs a higher rotational speed.

The controller compares the current rotational speed of the motor with the preset rotational speed and applies a corresponding drive signal to the motor based on a comparison result so that the motor can run at a rotational speed which does not exceed the preset rotational speed.

In one example, the step of controlling the motor to operate at the constant speed may be specifically optimized as described below.

The current rotational speed of the motor is compared with the preset rotational speed.

If the current rotational speed is greater than or equal to the preset rotational speed, the motor is controlled to operate at the constant speed which is the preset rotational speed.

If the current rotational speed is less than the preset rotational speed, the motor is controlled to operate at the constant speed which is the current rotational speed.

Specifically, when the current rotational speed of the motor is greater than or equal to the preset rotational speed, it indicates that the current rotational speed of the motor is relatively high. At this time, the controller controls the motor to operate at the preset rotational speed so as to satisfy the user's requirement on the electric tool for a low speed. For example, when the rotor of the motor is locked, the duty cycle of the drive signal applied to the motor is increased, and the torque of the motor is increased; and after the motor runs again, if the load of the motor is removed, the rotational speed of the motor inevitably increases under the action of the drive signal with the previous duty cycle. Therefore, at this time, the motor needs to be controlled to operate at the constant speed which is the preset rotational speed. The current rotational speed of the motor is compared with the preset rotational speed, and a corresponding drive signal is adaptively applied to the motor so that the motor switches between a locked rotor and an operation at a constant speed and the rotational speed of the motor is always kept lower than or equal to the preset rotational speed.

When the current rotational speed is less than the preset rotational speed, it indicates that the current rotational speed of the motor is relatively low. At this time, the controller may control the motor to operate at the constant speed which is the current rotational speed. For example, when the rotor of the motor is locked, the torque of the motor is increased to enable the motor to run; and after the motor runs, if the load is not removed, the rotational speed of the motor may be lower than the preset rotational speed. At this time, the duty cycle of the drive signal applied to the motor does not need to be increased and the motor is directly controlled to operate at the constant speed according to the current rotational speed.

A principle for controlling the rotational speed of the electric tool is described below. When the electric tool is in the low-speed mode, a targeted drive signal is applied to the motor of the electric tool according to the load condition. In this manner, the motor runs again and switches between the locked rotor and the operation at the constant speed so that the electric tool can adaptively adjust the rotational speed according to the load, thereby ensuring that the electric tool can overcome the problem of the locked rotor in response to a relatively large load in the low-speed mode and can operate at the constant speed which is a low speed.

In the method for controlling a rotational speed of an electric tool provided by the examples of the present disclosure, when the controller detects that the electric tool is in the set low-speed mode, the motor of the electric tool is started and controlled to operate at a constant speed so that the electric tool can operate at the constant speed which is a low speed when the electric tool is just started, thereby satisfying the user's requirement. When the rotor of the motor is locked, the controller increases the output torque to enable the motor to run again. After the motor is started and runs again, the controller determines how to control the rotational speed of the motor and causes the motor to operate at the constant speed according to the relationship between the current rotational speed of the motor and the preset rotational speed so that the electric tool can adjust the rotational speed of the motor according to a current load condition. In this manner, the problem of a locked rotor in response to a slightly larger load when an electric tool runs in a low-speed mode in the related art is solved; and when the electric tool is in the low-speed mode, the electric tool can adaptively adjust the output rotational speed of the motor according to the load condition, switch between the locked rotor and a constant-speed running mode, and finally enable the motor to operate at a constant speed, thereby improving user experience when the electric tool is in the low-speed mode.

Figure 2:
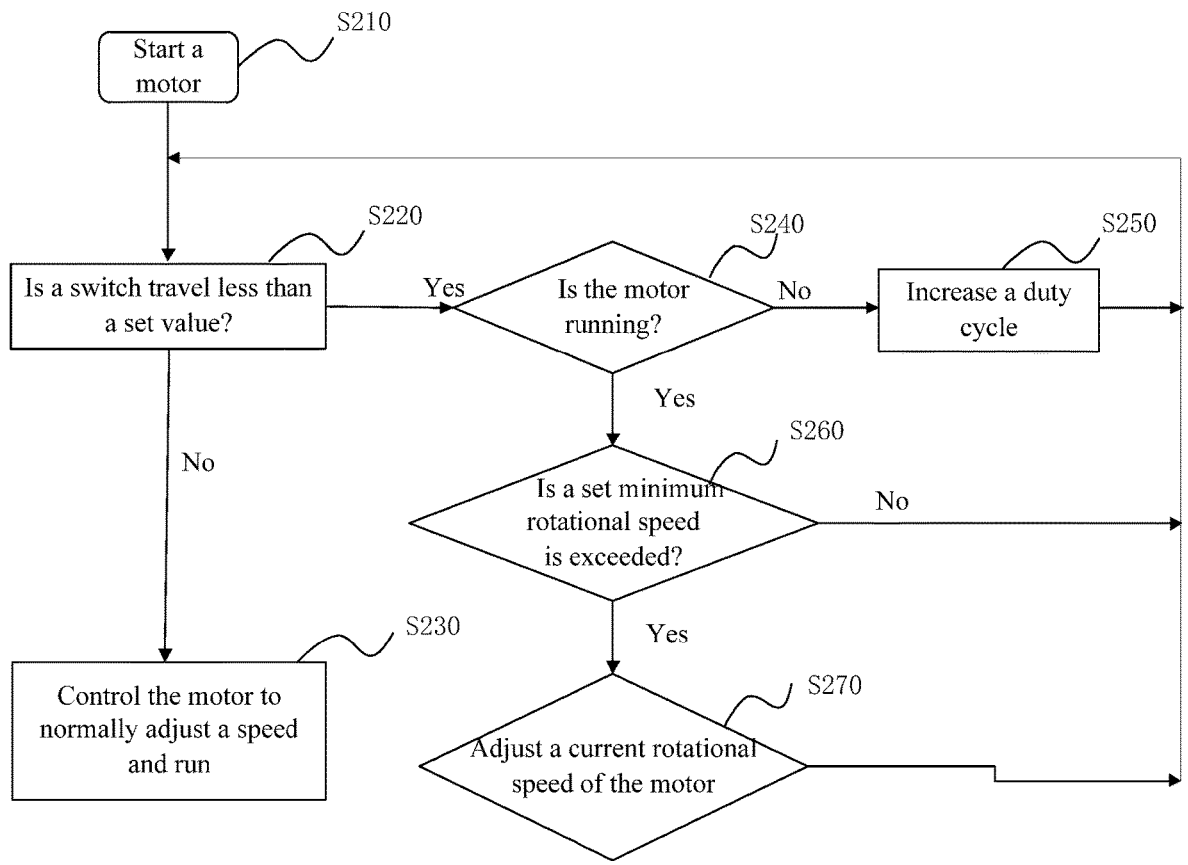
FIG. 2 is a flowchart of a method for controlling a rotational speed of an electric tool according to an example of the present disclosure.

In one example, the rotational speed of the motor is controlled by a method described below from when the electric tool is started. FIG. 2 is a flowchart of a method for controlling an electric tool according to an example of the present disclosure. The method specifically includes steps described below.

In S210, the motor is started.

In S220, a switch travel signal is acquired, and it is determined whether the switch travel signal is less than the set value.

In S230, if the switch travel signal is not less than the set value, the motor is controlled to normally adjust a speed and run.

When the switch travel signal is not less than the set value, it indicates that the user selects a non-low-speed operating mode as the operating mode of the electric tool at this time. Therefore, the controller applies a drive signal to the motor through the drive circuit according to a normal startup logic so as to control the motor to normally adjust the speed and run.

In S240, if the switch travel signal is less than or equal to the set value, it is further determined whether the motor is running.

When the switch travel signal is less than the set value, it indicates that the electric tool is in the set low-speed mode. At this time, whether the motor is running is determined, so that the corresponding drive signal is applied to the motor based on a current running condition of the motor.

In S250, if the motor is not running, the duty cycle is increased so that the intensity of the drive signal is increased.

In S260, if the motor is running, it is detected whether the rotational speed of the motor exceeds a set minimum rotational speed.

After it is determined that the motor is running, the current rotational speed of the motor is acquired, and whether the current rotational speed exceeds the set minimum rotational speed is further determined. If the current rotational speed does not exceed the set minimum rotational speed, the motor is controlled to operate at the constant speed which is the current rotational speed. If the current rotational speed exceeds the set minimum rotational speed, step 270 is performed so that the rotational speed of the motor is adjusted.

In S270, if the current rotational speed of the motor exceeds the set minimum rotational speed, the current rotational speed of the motor is adjusted based on the set minimum rotational speed.

When it is determined that the current rotational speed of the motor exceeds the set minimum rotational speed, the duty cycle of the drive signal applied to the motor is decreased so that the rotational speed of the motor is decreased until the rotational speed of the motor is decreased to the set minimum rotational speed, and the motor is controlled to operate at a constant speed which is the minimum rotational speed.

In the example of the present disclosure, when the electric tool is started, whether the electric tool is in the set low-speed mode is determined through the switch travel signal of the electric tool. When it is determined that the electric tool is in the low-speed mode, whether the motor of the electric tool is normally running is further detected, and when the motor is not normally running, the duty cycle of the drive signal is increased so as to increase the torque of the motor and normally start the motor. When the motor is running, whether the rotational speed of the motor exceeds the set minimum rotational speed is detected, and when the rotational speed exceeds the minimum rotational speed, the rotational speed of the motor is adjusted so as to enable the motor to run at the constant speed which is the minimum rotational speed. In this manner, the rotational speed of the motor is controlled not to exceed the set minimum rotational speed when the electric tool is in the low-speed mode, and the automatic adjustment of the rotational speed of the motor in the low-speed mode is achieved.

Figure 3:
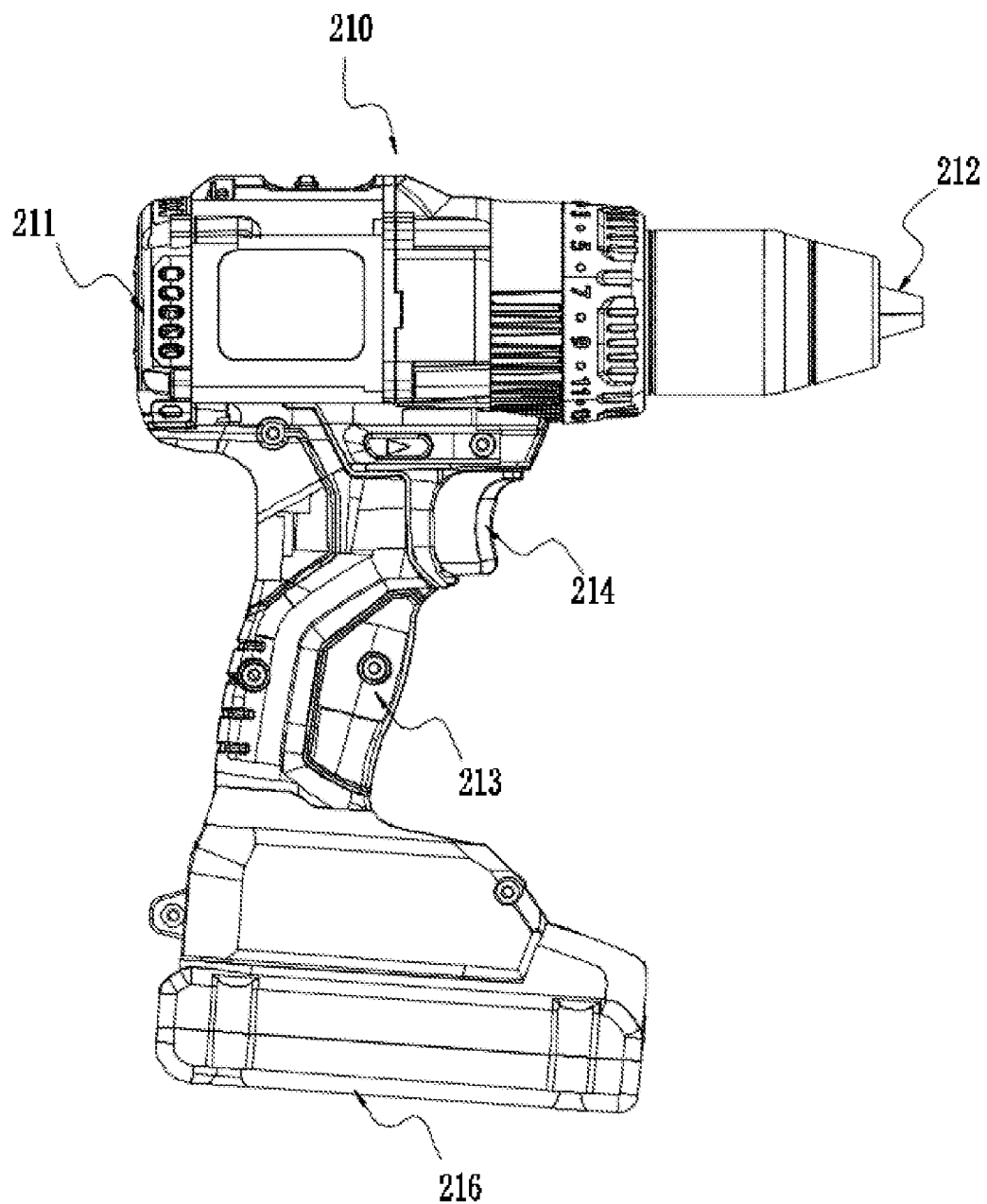
FIG. 3 is a structure view of an electric tool according to an example of the present disclosure.

Examples of the present disclosure further provide an electric tool, and the electric tool may typically be an electric drill, a grinding miller, a screwdriver, a reciprocating saw or the like. FIG. 3 is a structure view of an electric tool according to an example of the present disclosure. The electric tool 210 mainly includes a housing 211, a function part 212, a holding part 213, a travel switch 214, a power supply device 216, a motor and a controller.

The housing 211 is formed with the holding part 213 for a user to hold. Of course, the holding part 213 may be provided as an independent component. The housing 211 constitutes a main body of the electric tool 210 and is used for accommodating the motor, the controller, a transmission mechanism, and other electronic components such as a circuit board. A front of the housing 211 is configured to install the function part 212.

The function part 212 is used for implementing a function of the electric tool 210 and driven by the motor to run. Different electric tools 210 have different function parts. For example, for an angle grinder, the function part 212 is a grinding piece and used for grinding or cutting. The function part 212 is operatively connected to the motor. Specifically, the function part 212 is electrically connected to the motor via an output shaft 29 and the transmission mechanism 28.

The travel switch 214 is configured to output a switch travel signal, where the switch travel signal is used for determining an operating mode of the motor. Optionally, the operating mode of the motor includes at least a low-speed mode and a normal mode. The travel switch 214 is specifically configured to set a target rotational speed of the motor, that is, the travel switch 214 is used for adjusting a rotational speed of the motor. The travel switch 214 may be, but is not limited to, a trigger, a knob, a sliding mechanism, or the like. The controller may determine whether the electric tool 210 is in the set low-speed mode by acquiring an output signal of the travel switch 214. For example, an output signal of a trigger switch is acquired so that whether the trigger switch is within a set range of pressing angles and thus whether the electric tool is in the set low-speed mode is determined.

The power supply device 216 is configured to provide electrical energy for the electric tool 210. In this example, the electric tool 210 is powered by a battery pack. Optionally, the electric tool 210 further includes a battery pack jointing part 27 for connecting the power supply device 216, such as the battery pack, to the electric tool 210.

The motor and the controller of the electric tool 210 are disposed in the housing 211 (not shown in FIG. 3). The motor is configured to drive the corresponding function part to run in response to a control signal of the controller so that the electric tool 210 runs normally. The controller is configured to start the motor and control the motor to operate at a constant speed which is a preset rotational speed in response to determining that the motor is in the preset low-speed mode and control the motor to run and operate at a constant speed by adjusting the duty cycle in response to determining that a rotor of the motor is locked.

Figure 4:
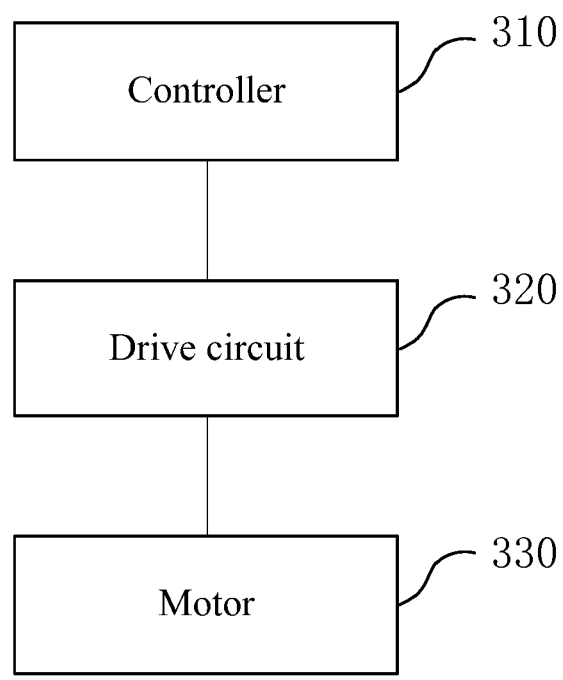
FIG. 4 is a block diagram of an electric tool according to an example of the present disclosure.

FIG. 4 is a block diagram of an electric tool according to an example of the present disclosure. The electric tool is further provided with a drive circuit 320. The controller 310 may apply a corresponding drive signal to the motor 330 through the drive circuit 320 to control the motor 330 to output a corresponding rotational speed. Specifically, the controller 310 is configured to perform operations described below.

In response to determining that the motor 330 of the electric tool 210 is in the preset low-speed mode, the motor 330 is started and controlled to operate at the constant speed which is the preset rotational speed.

If the rotor of the motor 330 is locked, output torque is increased until the motor 330 runs.

The motor 330 is controlled to operate at a constant speed based on a relationship between a current rotational speed of the motor 330 and the preset rotational speed.

Optionally, the controller 310 is further specifically configured to perform operations described below.

A travel signal of a switch of the electric tool 210 is acquired.

If the travel signal of the switch is less than or equal to a set value, it is determined that the motor 330 of the electric tool 210 is in the preset low-speed mode.

Optionally, the controller 310 is further specifically configured to perform operations described below.

A drive signal with a preset duty cycle is applied to the motor 330 until the motor 330 runs and rotates at a constant speed.

Optionally, the controller 310 is further specifically configured to determine that the rotor of the motor 330 is locked by a method described below.

A phase-change signal of the motor 330 is acquired.

If a next phase-change signal is not received within a set time threshold, it is determined that the rotor of the motor 330 is locked.

Optionally, the controller 310 is further specifically configured to perform operations described below.

A drive signal with a preset duty cycle increment is outputted to the motor 330 so that the output torque of the motor 330 is increased.

Optionally, the controller 310 is further specifically configured to perform an operation described below.

If a duty cycle of the drive signal reaches a set duty cycle threshold, the drive signal is stopped being outputted to the motor 330.

Optionally, the controller 310 is further specifically configured to perform an operation described below.

Before the motor 330 runs, if the duty cycle of the drive signal reaches the set duty cycle threshold, the drive signal is stopped being outputted to the motor 330.

Optionally, the controller 310 is further specifically configured to perform operations described below.

The current rotational speed of the motor 330 is compared with the preset rotational speed.

If the current rotational speed is greater than or equal to the preset rotational speed, the motor 330 is controlled to operate at the constant speed which is the preset rotational speed.

If the current rotational speed is less than the preset rotational speed, the motor 330 is controlled to operate at the constant speed which is the current rotational speed.

The controller provided by the example of the present disclosure may performed the method for controlling a rotational speed of an electric tool provided by the examples of the present disclosure and has corresponding function modules for performing the method and beneficial effects. For a matter not described in detail in this example, reference may be made to the description of method examples of the present disclosure.

It is to be noted that the above are merely preferred examples of the present disclosure and the technical principles used therein. It is to be understood by those skilled in the art that the present disclosure is not limited to the examples described herein. Those skilled in the art can make various apparent modifications, adaptations and substitutions without departing from the scope of the present disclosure. Therefore, while the present disclosure has been described in detail through the preceding examples, the present disclosure is not limited to the preceding examples and may further include more other equivalent examples without departing from the concept of the present disclosure. The scope of the present disclosure is determined by the scope of the appended claims.

What is claimed is:

1. An electric tool, comprising:
 a function part configured to implement a function of the electric tool;
 a motor configured to drive the function part to rotate;
 a travel switch configured to output a switch travel signal, wherein the switch travel signal is used for determining an operating mode of the motor; and
 a controller, wherein the controller is configured to:
  determine that the motor is in a preset low-speed mode according to the switch travel signal;
  start the motor and control the motor to operate at a constant speed which is a preset rotational speed in response to determining that the motor is in the preset low-speed mode;
  in the preset low-speed mode, output a drive signal with a preset duty cycle increment to the motor to increase an output torque of the motor until the motor restarts in response to determining that a rotor of the motor is locked, and
  after a locked state is eliminated and the motor is restarted, control the motor to work at the constant speed according to the preset rotational speed if a current rotational speed of the motor is greater than or equal to the preset rotational speed, and control the motor to work at the constant speed according to the current rotational speed if the current rotational speed of the motor is less than the preset rotational speed.

2. The electric tool of claim 1, wherein the operating mode of the motor comprises at least the preset low-speed mode and a normal mode.

3. The electric tool of claim 2, wherein the controller is further configured to determine that the motor is in the preset low-speed mode in response to determining that the switch travel signal is less than or equal to a set value and determine that the motor is in the normal mode in response to determining that the switch travel signal is greater than the set value.

4. The electric tool of claim 1, wherein the controller is further configured to compare a current rotational speed of the motor with the preset rotational speed, control the motor to operate at the constant speed which is the preset rotational speed in response to the current rotational speed being greater than or equal to the preset rotational speed, and control the motor to operate at the constant speed which is the current rotational speed in response to the current rotational speed being less than the preset rotational speed.

* * * * *